(12) United States Patent
Nakamoto

(10) Patent No.: US 6,664,727 B2
(45) Date of Patent: Dec. 16, 2003

(54) FIELD EMISION TYPE COLD CATHODE DEVICE, MANUFACTURING METHOD THEREOF AND VACUUM MICRO DEVICE

(75) Inventor: Masayuki Nakamoto, Chigasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 193 days.

(21) Appl. No.: 09/810,649

(22) Filed: Mar. 19, 2001

(65) Prior Publication Data
US 2001/0025962 A1 Oct. 4, 2001

(30) Foreign Application Priority Data
Mar. 31, 2000 (JP) .......................... 2000-098026

(51) Int. Cl.7 ................ H01J 1/62; G09F 9/00
(52) U.S. Cl. .................. 313/495; 313/309; 313/336; 313/351
(58) Field of Search ................ 313/309, 311, 313/351, 496, 497, 346 R, 495, 336

(56) References Cited

U.S. PATENT DOCUMENTS

| | | |
|---|---|---|
| 5,483,118 A | 1/1996 | Nakamoto et al. |
| 5,499,938 A | 3/1996 | Nakamoto et al. |
| 5,567,882 A | 10/1996 | Ichimura et al. |
| 5,629,782 A | 5/1997 | Ichimura et al. |
| 5,727,976 A | 3/1998 | Nakamoto et al. |
| 5,747,926 A | 5/1998 | Nakamoto et al. |
| 5,749,762 A | 5/1998 | Nakamoto et al. |
| 5,786,656 A | 7/1998 | Hasegawa et al. |
| 5,808,408 A | 9/1998 | Nakamoto |
| 5,834,324 A | 11/1998 | Nakamoto |
| 5,847,496 A | 12/1998 | Nakamoto et al. |
| 5,977,693 A | 11/1999 | Nakamoto et al. |
| 6,031,328 A | 2/2000 | Nakamoto |
| 6,097,138 A | 8/2000 | Nakamoto |

FOREIGN PATENT DOCUMENTS

JP  10-149760 A  *  6/1998

OTHER PUBLICATIONS

Yahachi Saito, et al., "Conical Beams From Open Nanotubes," Nature, vol. 389, Oct. 9, 1997, pp. 554–555.
S. Uemura, et al., "39.3: Carbon Nanotube Fed Elements," SID 98 Digest, 1998, pp. 1052–1055.
W.B. Choi, et al., "L2.1: Late–news Paper: A 4.5–in. Fully Sealed Carbon Nanotube–based Field–emission Flat–panel display," SID 99 Digest, pp. 1134–1137.

* cited by examiner

Primary Examiner—Ashok Patel
Assistant Examiner—Sharlene Leurig
(74) Attorney, Agent, or Firm—Oblon, Spivak, McClelland, Maier & Neustadt, P.C.

(57) ABSTRACT

A field emission type cold cathode device comprises a substrate, and a metal plating layer formed on the substrate, the metal plating layer contains at least one carbon structure selected from a group of fullerenes and carbon nanotubes, the carbon structure is stuck out from the metal plating layer and a part of the carbon structure is buried in the metal plating layer.

2 Claims, 5 Drawing Sheets

FIELD EMISION TYPE COLD CATHODE DEVICE, MANUFACTURING METHOD THEREOF AND VACUUM MICRO DEVICE

CROSS-REFERENCE TO RELATED APPLICATIONS

This application is based upon and claims the benefit of priority from the prior Japanese Patent Application No. 2000-098026, filed Mar. 31, 2000, the entire contents of which are incorporated herein by reference.

BACKGROUND OF THE INVENTION

The present invention concerns a field emission type cold cathode device, a manufacturing method thereof and a vacuum micro device using the field emission type cold cathode device.

As field emission type cold cathode device, one using fullerene or carbon nanotube for emitter has been proposed (for instance, Jpn. Pat. Appln. KOKAI Publication No. 10-149760). Fullerene and carbon nanotubes allow to lower the driving voltage and improve the field emission efficiency as their tip curvature radius is small. In addition, they can operate at a low vacuum degree, as they are influenced little by the atmosphere dependency or residual gas.

Concerning methods for forming the aforementioned field emission type cold cathode device, a method for dispersing fullerene or carbon nanotube in an organic solvent, applying and contact bonding on a substrate, a method for directly depositing fullerene or carbon nanotube on a substrate, a method for dispersing fullerene or carbon nanotube in a thick film paste, printing and annealing under a high temperature (about 500 to 800° C.), or the like are proposed.

However, when fullerene or carbon nanotube is contact bonded or deposited on a substrate, the adherence of fullerene or carbon nanotube is weak, and it is peeled off easily by a strong electric field applied to the emitter. Besides, when fullerene or carbon nanotube is formed by printing, the performance lowers or deteriorates due to high temperature annealing.

In addition, in contact boding, the patterning for cathode line formation is extremely difficult, because carbon is highly chemical-resistant, and etching is difficult. Otherwise, in a deposition method by CVD method or the like, catalyst of transition metal is required, and signal delay or the like is produced easily, because fullerene or carbon nanotube is required to be atomized, resulting in high resistance value. In the printing method also, signal delay or the like is produced easily, because of high film resistance, and in addition, difficulty of forming a thick film and, consequently, low resistance wiring.

Thus, field emission type cold cathode devices using fullerene or carbon nanotube as emitter have been proposed, conventionally, they were not necessarily sufficient in respect of reliability or performance.

BRIEF SUMMARY OF THE INVENTION

An aspect of the present invention intends to solve the aforementioned problems, and has an object to improve the reliability or performance of a field emission type cold cathode device using fullerene or carbon nanotube for emitter.

A field emission type cold cathode device according to a first aspect of the present invention, comprises a substrate; and a metal plating layer formed on the substrate; wherein the metal plating layer contains at least one carbon structure selected from a group of fullerenes and carbon nanotubes, the carbon structure is stuck out from the metal plating layer and a part of the carbon structure is buried in the metal plating layer.

The field emission type cold cathode device further may comprise a conductive layer formed between the substrate and the metal plating layer.

In the field emission type cold cathode device, the metal plating layer may be selected from a group of nickel, chromium and copper.

In the field emission type cold cathode device, the metal plating layer may be formed by either electroplating processing or electroless plating processing.

According to an aspect of the present invention, the metal layer is firmly fixed to the support substrate, and further fullerene or carbon nanotube is firmly fixed to the metal plating layer as a part of fullerene or carbon nanotube is buried in the metal plating layer. In other words, among fullerene or carbon nanotube contained in the metal plating layer, fullerene or carbon nanotube having protrusions (functioning substantially as electron emission section) on the surface of the metal plating layer is firmly fixed to the metal plating layer, because the portion under the protrusion is buried in the metal plating layer. Consequently, an adhesion resistance that can resist sufficiently against a strong electric field applied to the emitter can be obtained, and it becomes possible to obtain a high performance field emission type cold cathode device excellent in field emission stability.

Here, the metal plating layer (metal plating film) obtained by plating processing is fine, and better in conductivity and hardness, compared to the metal film obtained by sputtering method or printing method. As for the conductivity, the metal plating film is almost equivalent to bulk metal (equal or superior to about 99% of bulk metal conductivity), and lower in resistance compared to sputtered metal film (about 30 to 90%), and thick film printed metal film (about 10 to 20%). Concerning the hardness, when compared in Vickers hardness and Brinell hardness, the metal plating film is almost equivalent to the bulk metal (equal or superior to about 90%) and can be about 10 times in some cases, and extremely harder than the sputtered metal film and thick film printed metal film.

Further, the metal plating film can be formed in an almost even thickness, even if the surface to be plated is rough. For example, the metal plating film formed on the cathode line surface can make the film thickness almost equivalent at the top and the side of the cathode line.

Also, as the plating processing is performed at a low temperature, the metal plating film allows to obtain an emitter with less performance loss or deterioration. In addition, as it allows to obtain a high conductive film and to increase the thickness, the resistance of the cathode line can be lowered, and signal delay or the like can be suppressed. Moreover, as patterning is easy, the cathode line can be created easily.

Besides, when a convex emitter structure is formed using metal plating film, the electron emission point can be fixed easily, as electric field is concentrated to the convex tip section. In addition, as convex metal plating layer can be separated easily from the mold by lubricating effect of fullerene or the like, mold wear or damage can be suppressed even when the mold is used repeatedly.

Moreover, in the field emission type cold cathode device, the carbon nanotubes may have a conductive material inside.

The conductive material is preferably a constituent of a plating liquid used for forming the metal plating layer. The conductive material is preferably selected from Mo, Ta, W, Ni, Cr, Fe, Co, Cu, Si, $LaB_6$, AlN, GaN, carbon, graphite and diamond.

Thus, the formation of the conductive material section inside a hollow structure that the carbon nanotube has, makes the conductive material work as core material, allowing to increase the carbon nanotube mechanical resistance. Especially, the formation of conductive material section with a content of plating liquid used to form the metal plating layer, allows to perform plating and forming the conductive material section in parallel, and consequently, to simplify the process.

Here, in the field emission type cold cathode device, the metal plating layer may contain additive material for increasing resistance of the metal plating layer. The additive material is preferably selected from boron, phosphorus and polytetrafluoroethylene (PTFE). The additive material, blended (dispersed preferably) simple or in the form of compound in the plating liquid, can be contained easily in the metal plating layer, when the metal plating layer is formed by plating.

When the emitter tip is different in curvature radius, shape or the like, the field emission characteristics become uneven because of different electric field strength distribution. As mentioned above, when the resistance of the metal plating layer is increased by including additive material in the metal plating layer, the voltage drops due to the metal plating layer. As the result, even when the emitter tip is different in curvature radius, shape or the like, the electric field strength distribution of the emitter tip is evened by so-called resistive ballasting effect, allowing to improve considerably the field emission stability and evenness.

A vacuum micro device according to a second aspect of the present invention, comprises: a substrate; a metal plating layer formed on the substrate, the metal plating layer containing at least one carbon structure selected from a group of fullerenes and carbon nanotubes, and the carbon structure being stuck out from the metal plating layer and a part of the carbon structure being buried in the metal plating layer; and an electrode disposed separately from the substrate, the electrode being applied a higher electrical potential than an electrical potential applied to the metal plating layer.

The vacuum micro device preferably further comprises a conductive layer formed between the substrate and the metal plating layer.

A vacuum micro device according to a third aspect of the present invention, comprises a first substrate; a conductive layer formed on the first substrate; a metal plating layer formed on the conductive layer, the metal plating layer containing at least one carbon structure selected from a group of fullerenes and carbon nanotubes, and the carbon structure being stuck out from the metal plating layer and a part of the carbon structure being buried in the metal plating layer; a second substrate opposed to the first substrate; an electrode formed on the second substrate, the electrode being applied a higher electrical potential than an electrical potential applied to the metal plating layer; and a luminescent material formed on the electrode.

The vacuum micro device preferably further comprises an insulation layer formed on the substrate; and a gate electrode formed on the insulation layer and between the metal plating layer and the electrode.

A manufacturing method of field emission type cold cathode device according to a fourth aspect of the present invention, comprises immersing a substrate in a plating liquid containing at least one carbon structure selected from a group of fullerenes and carbon nanotubes; and forming a metal plating layer on the conductive layer, wherein the carbon structure is stuck out from the metal plating layer and a part of the carbon structure is buried in the metal plating layer.

The manufacturing method preferably further comprises forming a conductive layer on a substrate before immersing the substrate.

A manufacturing method of field emission type cold cathode device according to a fifth aspect of the present invention, comprises forming a conductive layer on a first substrate having concaves; immersing the first substrate in a plating liquid containing at least one carbon structure selected from a group of fullerenes and carbon nanotubes; forming a metal plating layer on the conductive layer, the carbon structure being stuck out from the metal plating layer and a part of the carbon structure being buried in the metal plating layer; pressing a second substrate to the first substrate sandwiching the metal plating layer; and removing the first substrate from the second substrate leaving the metal plating layer on the second substrate.

In the manufacturing methods of the field emission type cold cathode device, the plating processing is preferably one of electroplating processing and electroless plating processing. Especially, when the metal plating layer is formed by electroplating, the carbon nanotube can easily be oriented vertically along the line of electric force. Consequently, the proportion of carbon nanotube oriented vertically can be increased, and the field emission efficiency and the evenness of field emission can be enhanced.

DETAILED DESCRIPTION OF THE INVENTION

Now the embodiments of the present invention will be described referring to drawings.

(Embodiment 1)

FIG. 1A to FIG. 1D show schematically the manufacturing process of field emission type cold cathode device according to a first embodiment of the present invention.

Figure 1A:
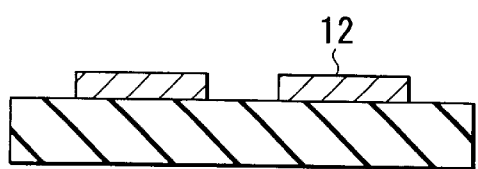
FIG. 1A to FIG. 1D show schematically the manufacturing process of field emission type cold cathode device according to a first embodiment of the present invention.

First, as shown in FIG. 1A, a cathode line 12 is formed on a glass substrate (support substrate) 11. Considering signal delay in a large field emission type display, Ni plating film allowing to obtain a high conductive film is formed with a thickness of about 2 $\mu$m, as metal film to be the cathode line 12.

Next, Ni—B—P base electroless plating liquid 13a, adjusted to about PH5, is prepared by dissolving about 25 g of nickel sulfate, about 40 g of sodium hypophosphite, about 10 g of sodium acetate, about 10 g of sodium citrate, and about 30 g of boric acid in about 1 liter of distilled water. About 50 g of fullerene $C_{60}$ or carbon nanotube are mixed in this plating liquid.

Both fullerene and carbon nanotube are carbon allotropies, and basically of the homogeneity. An extremely long fullerene of specific form becomes carbon nanotube. The basic type of fullerene is $C_{60}$ composed of 6-membered rings of carbon and 5-membered rings of carbon, having a diameter of about 0.7 nm. $C_{60}$ has a structure wherein sp2 orbital hybridization carbon atoms are disposed at all of apexes of a 32-hedron obtained by cutting off all apexes of 12 pyramids in a regular 20-hedron.

As for fullerene, except for $C_{60}$, higher order fullerenes having more than 60 carbons, such as $C_{70}$, $C_{76}$, $C_{82}$, $C_{84}$, $C_{90}$, $C_{96}$, ..., $C_{240}$, $C_{540}$, $C_{720}$ and so on exist substantially without limit, and of course they may also be used. In addition, as the inside of fullerene is hollow, onion type fullerenes wherein several layers of lower order fullerene are packed in a higher order fullerene exist, and they may be used. Moreover, fullerenes encapsulating metal in the cavity, such as La@$C_{60}$, La@$C_{76}$, La@$C_{84}$, $La_2$@$C_{80}$, $Y_2$@$C_{84}$, $Sc_3$@$C_{82}$, or the like may also be used. Further, hetero fullerene incorporating atoms other than carbon, such as N, B, Si in the skeletal portion of fullerene may be used. These fullerenes can be obtained by evaporating carbon by means of laser irradiation, arc discharge or resistance heating to graphite, cooling, reacting and condensing evaporated carbon passing through helium gas, and collecting condensed carbon by a collection member.

Figure 1B:
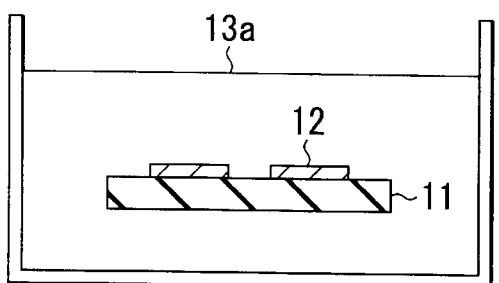

Next, plating solution 13a prepared as mentioned above is stirred in a plating vessel 14. Thereafter, as shown in FIG. 1B, the glass substrate 11 on which a cathode line 12 is formed is immersed in the plating solution 13a, and electroless plating is performed while keeping the temperature of the plating solution 13a at about 80° C.

Figure 1C:
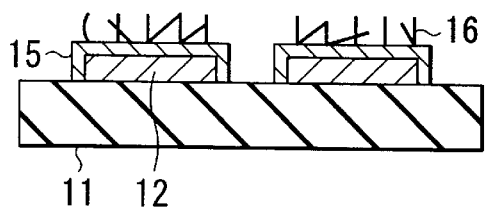
Figure 1D:
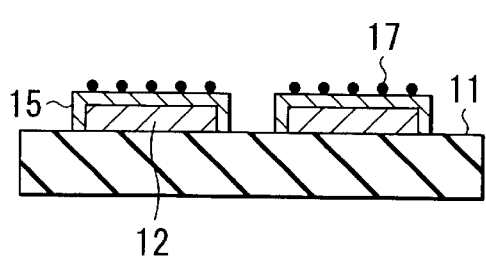

Thus, the glass substrate is immersed in the plating solution 13a for about 3 minutes. As the result, fullerene or carbon nanotube has precipitated down to contact with the cathode line 12, and a Ni—B—P base electroless plating layer (metal plating layer 15) containing fullerene 17 or carbon nanotube 16 is formed on the cathode line 12 with a thickness of about 3 $\mu$m as shown in FIG. 1C (for carbon nanotube) or FIG. 1D (for fullerene). The using of plating method allows to obtain a metal plating layer 15 of a film thickness almost equivalent at the top and the side of the cathode line 12. Besides, on the glass substrate 11 between adjacent cathode lines 12, the metal plating layer 15 is formed scarcely, or if formed, peeled off easily under the ultrasonic processing, because of weak adherence of the metal plating layer 15. After being rinsed with water and dried, a patterned field emission type cold cathode can be obtained.

Figure 2A:
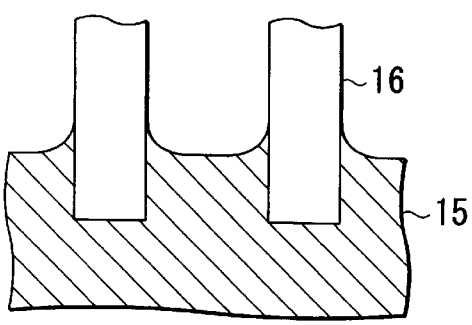
FIG. 2A and FIG. 2B show schematically the structure of essential part of the field emission type cold cathode device shown in FIG. 1C and FIG. 1D.
Figure 2B:
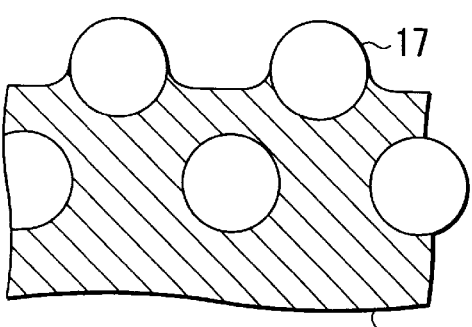

FIG. 2A (for carbon nanotube) and FIG. 2B(for fullerene) show schematically the structure of essential parts of the metal plating layer 15 containing fullerene 17 or carbon nanotube 16, formed by the method mentioned above.

As shown in FIG. 2A and FIG. 2B, among a number of fullerene 17 or carbon nanotubes 16 existing on the cathode line integrated with the metal plating layer 15, some fullerene 17 or carbon nanotubes 16 protrude outside the metal plating layer 15. Portions protruding outside the metal plating layer 15 in this way function substantially as electron emission portions. The lower portion of the fullerene 17 or carbon nanotubes 16 having portions protruding outside the metal plating layer 15 are buried in the metal plating layer 15. Therefore, these fullerene 17 or carbon nanotubes 16 are fixed firmly to the metal plating layer 15, assuring a sufficient adhesion resistance.

In FIG. 2A and FIG. 2B, a thin metal plating layer 15 may well be formed along the outer periphery of fullerene 17 or carbon nanotubes 16 protruding outside the metal plating layer 15.

Field emission characteristics of the field emission type cold cathode manufacture as mentioned above are measured; the metal plating layer 15 holds a firm adherence and does not peel off against a strong electric field of equal or superior to about $10^7$ V/cm applied to the emitter tip, and stable field emission characteristics can be obtained.

Further, the addition of impurities such as boron or phosphorus in the metal plating layer 15 permits the metal plating layer 15 to have a certain magnitude of resistance value. Therefore, the current emission stability is improved by about 20 to 30%, and the even field emission characteristics in the plane is also improved by the so-called resistive ballasting effect.

Also, the tip curvature radius can be reduced considerably compared to the Mo emitter manufactured by the rotary evaporation method. To be more specific, it can be reduced from about 70 to 300 nm to about 1 to 30 nm. As the result, the driving voltage also can be reduced form about 100 V to about 7 V. On the other hand, when the vacuum degree lowers from about $10^{-9}$ torr to about $10^{-7}$ torr, the emission current value is reduced to equal or inferior to about 1/10, and the current variation increases by equal or superior to several hundreds percents for the Mo emitter manufactured by the rotary evaporation method, but they vary hardly for the present embodiment.

Thus, in this embodiment, fullerene or carbon nanotube are dispersed in the plating liquid to perform the plating processing, allowing fullerene or the like to precipitate and come into contact with the cathode surface, forming a metal plating layer. Therefore, fullerene or the like is fixed firmly to the metal plating layer as well as the metal plating layer is firmly fixed to the cathode. As a result, a highly adhesive emitter that can resist a strong electric field is obtained, and the field emission stability can be enhanced.

Moreover, in this embodiment, as the plating processing is performed at a low temperature equal or inferior to about 100° C., an emitter can be manufactured with little damage.

In addition, conventionally, when the emitter tip was different in curvature radius, shape or the like, the field emission characteristics became remarkably uneven, because of different electric field strength distribution. In this embodiment, a Ni—B—P base resistive plating layer containing impurities in the metal plating layer and presenting a resistance value higher than the Ni plating layer is used. Consequently, as the potential lowers due to resistive plating layer, even when the emitter tip is different in curvature radius, shape or the like, the electric field strength of the emitter tip lowers substantially by the resistive ballasting effect, and field emission stability and evenness are improved.

Moreover, if the cathode line is formed on the glass substrate beforehand, the metal plating layer can be formed selectively on the cathode line, and the process can be simplified.

Figure 3:
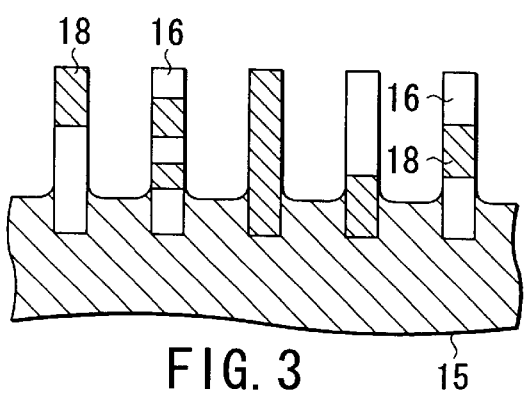
FIG. 3 shows schematically the structure of essential part of a variant of the field emission type cold cathode device shown in FIG. 1C.

FIG. 3 shows schematically the structure of the essential part of a variant of the present embodiment.

In the example shown in FIG. 3, a filled layer 18 is formed as core material in the carbon nanotube 16 having a hollow structure. As the carbon nanotube 16 has the hollows structure, plating liquid can be introduced in the carbon nanotube 16 during the plating processing. Therefore, as shown in FIG. 3, the filled layer 18 can be formed in the carbon nanotube 16 with substance contained in the plating liquid. For example, Ni, Cu or the like can be dissolved in the plating liquid and extracted inside the carbon nanotube 16, or material constituting the filled layer may be dispersed in the plating liquid.

As for material composing the filled layer 18, it is preferable to used conductive material such as Mo, Ta, W, Ni, Cr, Fe, Co, Cu, Si, $LaB_6$, AlN, GaN, carbon, graphite, diamond, or the like.

Having normally a large aspect ratio, the carbon nanotube decreases in its mechanical strength when it becomes longer. In this example, as the inside of the carbon nanotube 16 is filled with the filled layer 18 constituting core material, the mechanical strength can be improved. Therefore, effects such as handling improvement in the manufacturing process, prevention of destruction due to electric field concentration or the like can be obtained, allowing to obtain an emitter structure excellent in reliability can be obtained.

It is also possible to form the filled layer previously in the carbon nanotube before forming the metal plating layer, or to form the filled layer in the carbon nanotube after having formed the metal plating layer. When the filled layer is formed previously in the carbon nanotube before forming the metal plating layer, the filling material may be melted beforehand, and absorbed in the carbon nanotube. Also, the carbon nanotube may be filled with material constituting catalyst (for example, transition metal, or the like) when the carbon nanotube is formed by CVD method or the like.

Note that the structure as shown in FIG. 3 can equally be applied not only to this embodiment, but also to other embodiments.

(Second Embodiment)

Figure 4A:
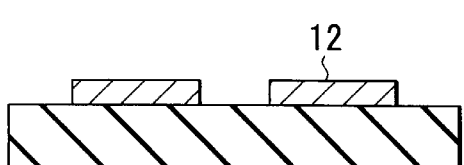
FIG. 4A to FIG. 4C show schematically the manufacturing process of field emission type cold cathode device according to a second embodiment of the present invention.
Figure 4B:
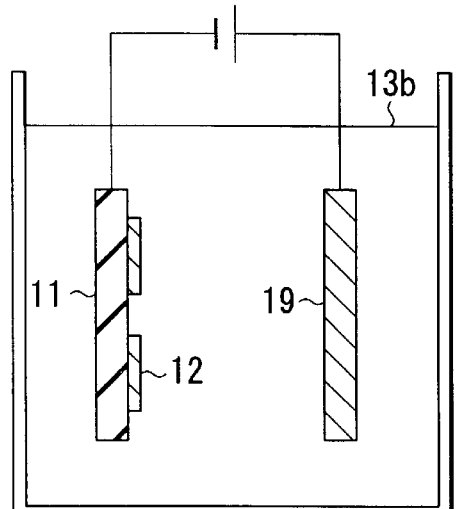
Figure 4C:
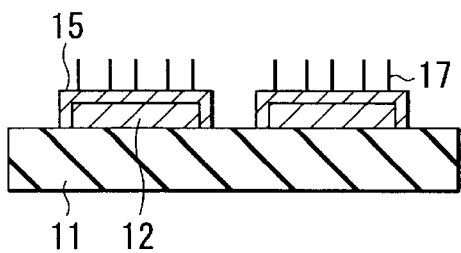

FIG. 4A to FIG. 4C show schematically the manufacturing process of field emission type cold cathode device according to a second embodiment of the present invention.

First, as shown in FIG. 4A, a cathode line 12 is formed on a glass substrate (support substrate) 11. Similarly to the first embodiment, in the present embodiment, considering signal delay in a large field emission type display, Ni plating film allowing to obtain a high conductive film with a thickness of about 1 μm was formed, as metal film becoming the cathode line 12.

Next, an electroplating liquid 13b, adjusted to about PH4, is prepared by dissolving about 600 g of nickel sulfamate, about 5 g of nickel chloride, about 30 g of sodium hypophosphite, and about 40 g of boric acid and about 1 g of saccharin in about 1 liter of distillated water. About 40 g of carbon nanotube are mixed in this plating liquid.

Plating solution 13b prepared as mentioned above is stirred in a plating vessel 14 and thereafter, as shown in FIG. 4B, the glass substrate 11 on which a cathode line 12 is formed is immersed in the plating solution 13b, and electroplating is performed while keeping the temperature of the plating solution 13b at about 50° C. Namely, electroplating is performed by applying current between the electrode 19 and the cathode line 12.

Consequently, an Ni—B—P base resistive plating layer (metal plating layer 15) containing carbon nanotube 17 is formed on the cathode line 12 with a thickness of about 4 μm, as shown in FIG. 4C. The using of plating method allows to obtain a metal plating layer 15 of a film thickness almost equivalent at the top and the side of the cathode line 12. On the glass substrate 11 between adjacent cathode lines 12, the metal plating layer 15 is formed scarcely, because of weak adherence of the metal plating layer 15.

Similarly to the first embodiment, in the present embodiment, as shown in FIG. 2A, the lower portion of the carbon nanotubes 17 having portions protruding outside the metal plating layer 15 are buried in the metal plating layer 15, assuring therefore a sufficient adhesion strength.

In the first embodiment, as the metal plating layer 15 is formed by elecroless plating, the carbon nanotubes 17 are oriented in various directions; however, in the embodiment, as the metal plating layer 15 is formed by elecroplating, the carbon nanotubes 17 can be oriented easily in the vertical direction along the line of electric force. Consequently, the proportion of vertically oriented carbon nanotubes 17 can be increased. The proportion of carbon nanotubes 17 oriented with an angle of about 70 to 110 degrees relative to the substrate surface is about 50 to 100% under the normal condition, and the proportion can be changed by adjusting electroplating conditions, or the like. Thus, in the present embodiment, as the proportion of vertically oriented carbon nanotubes 17 can be increased, it is possible to enhance the field emission rate.

Field emission characteristics of the field emission type cold cathode manufacture as mentioned above are measured; the metal plating layer holds a firm adherence and does not peel off against a strong electric field of equal or superior to about $10^7$ V/cm applied to the emitter tip, and stable field emission characteristics can be obtained.

Further, similarly to the first embodiment, the addition of impurities such as boron or phosphorus in the metal plating layer permits to improve the current emission stability by about 40 to 50%, and the evenness of the field emission in the plane is also improved substantially by the so-called resistive ballasting effect.

In addition, the driving voltage can be reduced by about 3%, compared to the non-oriented case, because the orientation has been improved. Besides, similarly to the first embodiment, the emission current value and current fluctuation change scarcely when the vacuum degree is reduced.

In this embodiment also, effects similar to the first embodiment can be obtained and, in addition, as the metal plating layer is formed by elecroplating, the carbon nanotubes can be oriented easily in the vertical direction, and it becomes possible to enhance the field emission efficiency and the field emission evenness.

(Third Embodiment)

FIG. 5A to FIG. 5D show schematically the manufacturing process of field emission type cold cathode device according to a third embodiment of the present invention.

First, a mold substrate having a cavity sharpened at the bottom is prepared. As for a method for forming such cavity, there is a method using anisotropic etching of Si single crystal substrate as shown below. Note that it is also possible to form a mold having a similar cavity, using Ni or other metals, resin or glass or other materials.

Figure 5A:
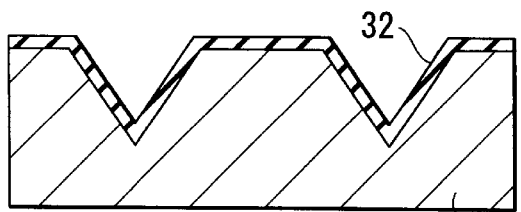
FIG. 5A to FIG. 5D show schematically the manufacturing process of field emission type cold cathode device according to a third embodiment of the present invention.

As shown in FIG. 5A, $SiO_2$ film of about 0.1 μm in thickness is formed on the p type Si single crystal substrate 31 of (100) crystal face orientation by dry heat oxidation method, and a resist film is coated thereon by spin coat method. Then, the resist film is exposed to light and developed so as to obtain an opening pattern of about 1 μm square. Thereafter, $SiO_2$ film is etched by $NH_4F.HF$ mixed solution. After the removal of resist film, anisotropic etching is performed with KOH aqueous solution of about 30 wt % so that a reversed pyramid shaped cavity of about 0.7 μm in depth is formed on the surface of Si single crystal substrate 31. Next, after removal of $SiO_2$ film using $NH_4F.HF$ mixed solution, $SiO_2$ film 32 is formed on the Si single crystal substrate 31 where the cavity is formed. In this example, this $SiO_2$ film 32 is formed about 0.3 μm in thickness by wet heat oxidation method.

Figure 5B:
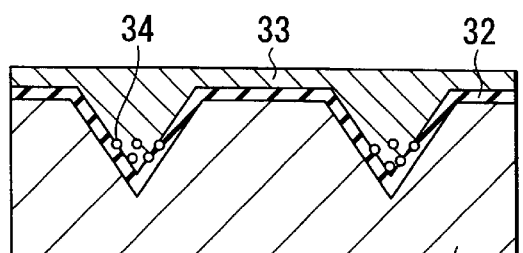

Then, as shown in FIG. 5B, Ni—B—P base electroless plating liquid as shown in the first embodiment is prepared, and about 50 g of fullerene $C_{60}$ is mixed and stirred in this electroless plating liquid. Thereafter, Ni—B—P base electroless plating layer of about 0.1 to 0.3 μm in thickness, containing fullerene, is formed on the $SiO_2$ film 32, by immersing Si single crystal substrate 31 in the electroless plating liquid. Following this, Ni—B—P base electroplating liquid as shown in the second embodiment is prepared, and about 50 g of fullerene $C_{60}$ is mixed and stirred in this electroplating liquid. Thereafter, Ni—B—P base resistive plating layer of several μm in thickness, containing fullerene, is formed on the electroless plating layer, by immersing Si single crystal substrate 31 where the electroless plating layer is formed in the electroplating liquid. In this way, a metal plating layer 33 including fullerene 34 made of laminated structure of electroless plating layer and electroplating layer is formed.

Figure 5C:
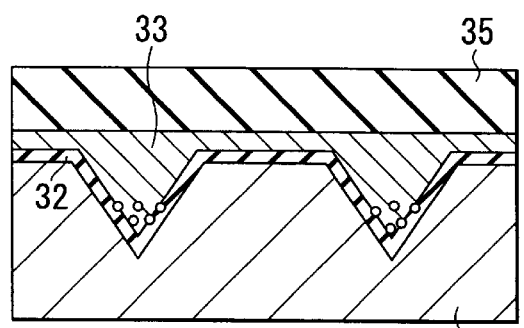

Then, as shown in FIG. 5C, a glass substrate 35 is prepared as support substrate, and the glass substrate 35 and the Si single crystal substrate 31 are adhered sandwiching the metal plating layer 33. They may be adhered using adhesives or the like, but the electrostatic adhesion method is used in this example.

Figure 5D:
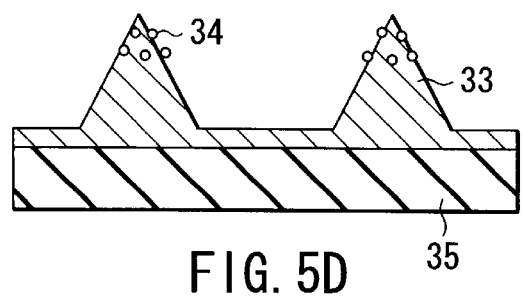

Next, as shown in FIG. 5D, the Si single crystal substrate 31 where silicon oxide film 32 is formed is separated form the glass substrate 35 to which the metal plating layer 33 is adhered, by dissolution, peeling off or the like. In this way, an emitter section made of sharp metal plating layer 33 to which fullerene 34 is fixed is formed, and a field emission type cold cathode adapted for mass production is obtained. Note that when the metal plating layer 33 covers the surface of fullerene 34, fullerene 34 may be exposed by removing the metal plating layer 33 with etching liquid or the like, or the metal plating layer 33 may remain covering the fullerene 34 provided that desired characteristics can be obtained.

In this embodiment also, effects similar to the first and second embodiment can be expected and, in addition, having a convex emitter form, the electric field is concentrated to the convex tip section. As the result, the electron emission point can be defined easily, facilitating the control and improving emitted current evenness in the plane, the evenness of emitted electron beam shape in the plane, or the like. In addition, as convex metal plating layer can be separated easily from the mold by lubricating effect of fullerene of the like, mold wear or damage can be suppressed even when the mold is used repeatedly.

(Fourth Embodiment)

Figure 6A:
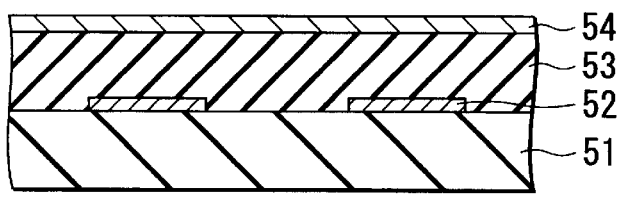
FIG. 6A to FIG. 6C show schematically the manufacturing process of vacuum micro device according to a fourth embodiment of the present invention.
Figure 6B:
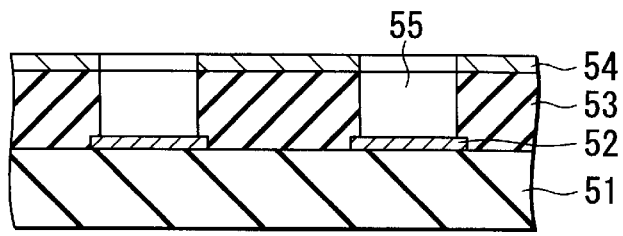
Figure 6C:
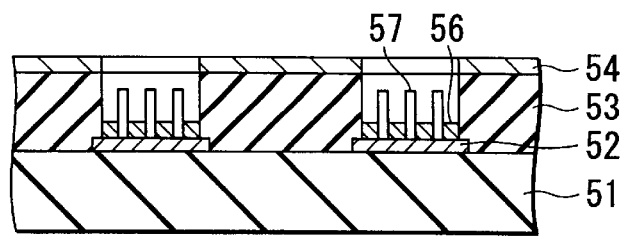

FIG. 6A to FIG. 6C show schematically the manufacturing process of vacuum micro device according to a fourth embodiment of the present invention. This vacuum micro device is manufactured by applying the manufacturing method of field emission type cold cathode using the plating method as shown in the first or second embodiment.

First, as shown in FIG. 6A, a cathode line 52 is formed on a glass substrate (support substrate) 51. Following this, an insulation layer 53 made of $SiO_2$, or SiN or the like is formed on the glass substrate 51 and the cathode line 52, and further, a gate electrode layer 54 made of conductive material such as W is formed thereon. The insulation layer 53 can be formed by electron beam evaporation method, sputtering CVD method or others.

Next, as shown in FIG. 6B, the gate electrode layer 54 and the insulation layer 53 are patterned by lithography technology to form gate electrodes and gate wiring. At this time, the cathode line 52 is exposed in a cavity (concave portion) 55 surrounded by the insulation film 53 and the gate electrode layer 54.

Next, as shown in FIG. 6C, a metal plating layer 56 containing carbon nanotube 57 is formed on the cathode line 52, by the plating processing as shown in the first or second embodiment.

Thus, a vacuum micro device using the carbon nanotube 57 fixed to the metal plating layer 56 as electron emission section is manufactured. It goes without saying, a metal plating layer 56 including fullerene in place of carbon nanotube 57 may be formed.

(Fifth Embodiment)

Figure 7:
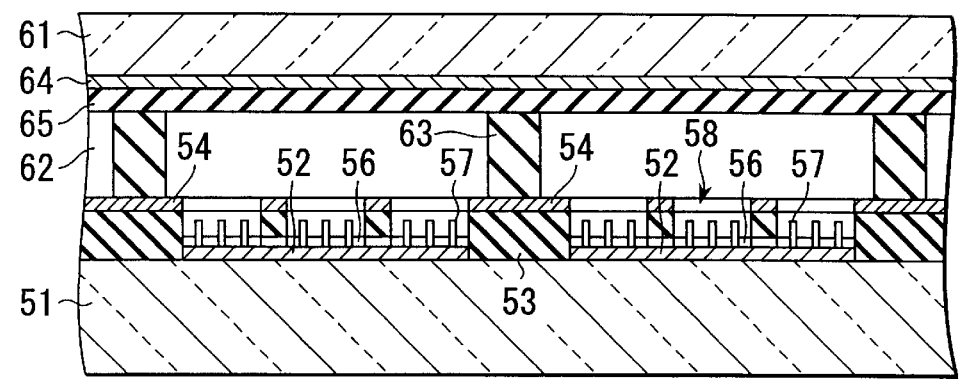
FIG. 7 shows schematically an example of flat type image display device according to a fifth embodiment of the present invention.

FIG. 7 shows schematically an example of flat type image display device, as vacuum micro device according to a fifth embodiment of the present invention. This flat type image display device is manufactured by applying the vacuum micro device as shown in the fourth embodiment (refer to FIG. 6). In other words, it is manufactured by applying the manufacturing method of field emission type cold cathode using the plating method as shown in the first or second embodiment.

In this flat type image display device, a plurality of gate lines made of gate electrode layer 54 are arranged in the direction parallel to the paper surface, and a plurality of cathode lines 52 are arranged in the direction vertical to the paper surface. In addition, a group of emitters made of a plurality of emitters 58 are disposed on the cathode line 52, corresponding to the respective pixels.

A glass substrate (opposite substrate) 61 is disposed at a position opposed to the glass substrate (support substrate) 51, and a vacuum discharge space 62 is formed between two substrates. The interval between two substrate 51 and 61 is maintained by a frame in the periphery and a spacer 63. In addition, an anode electrode 64 and a fluorescent element layer 65 are provided on the opposed surface of the glass substrate 61.

In this flat type image display device, pixel light-up and light-off are selected by arbitrarily setting the voltage between the gate electrode 54 and the emitter 58 for respective pixel, through the gate line and cathode line. The selection of respective pixel is performed by so-called matrix driving. For instance, the desired pixel is selected by applying a predetermined potential which is the selection signal to the cathode line, in synchronization with the application of a predetermined potential by sequentially selecting the gate line.

When a certain gate line and a certain cathode line are selected and a predetermined potential is applied to the respective lines, a group of emitters at the intersection of the concerned gate line and cathode line operates. Electrons emitted from the group of emitters arrive at the fluorescent element layer 65 at the position corresponding to the selected group of emitter by the potential applied to the anode electrode 64, and lights up the fluorescent element layer 65.

Figure 8:
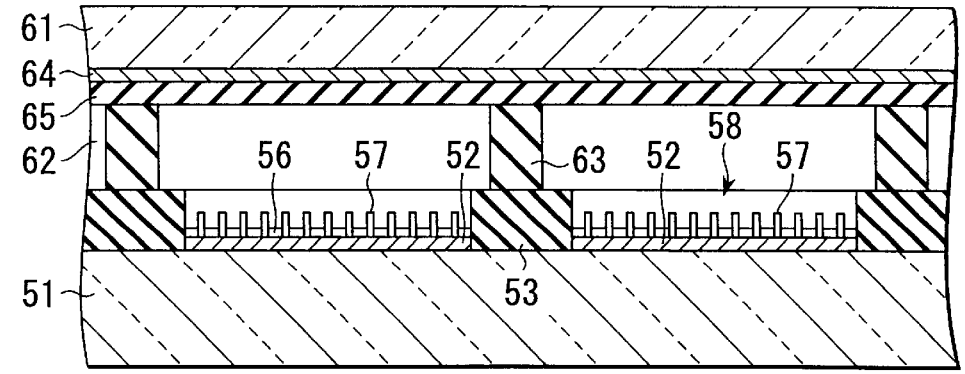
FIG. 8 shows schematically another example of flat type image display device according to a fifth embodiment of the present invention.

FIG. 8 shows schematically another example of flat type image display device according to this embodiment. This flat type image display device is also manufactured by applying the vacuum micro device as shown in the fourth embodiment (refer to FIG. 6). In other words, it is manufactured by applying the manufacturing method of field emission type cold cathode using the plating method as shown in the first or second embodiment. However, in the flat type image display device according to this embodiment, the display is performed without using the gate electrode.

In this flat type image display device, in place of gate line made of gate electrode layer 54 shown in FIG. 7, transparent anode electrodes 64 (anode lines) formed on the glass substrate 61 are arranged in a direction parallel to the paper surface.

Pixel light-up and light-off are selected by arbitrarily setting the potential between the anode electrode 64 and the emitter 58 for respective pixels, through the anode line and cathode line. When a certain anode line and a certain cathode line are selected and a predetermined potential is applied to the respective lines, a group of emitters situated at the intersection of the concerned anode line and cathode line operates, and the luminescent element layer 65 at the position corresponding to the selected group of emitters lights up.

Figure 9:
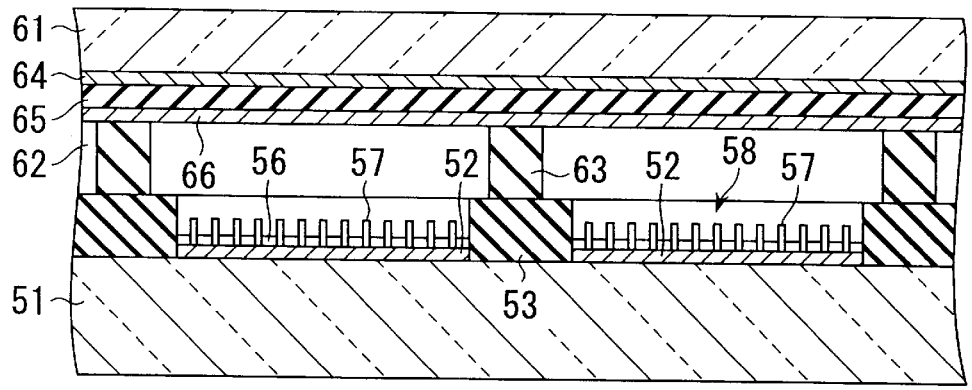
FIG. 9 shows schematically another example of flat type image display device according to a fifth embodiment of the present invention.

FIG. 9 shows schematically another example of flat type image display device according to this embodiment. This flat type image display device is also manufactured by applying the vacuum micro device as shown in the fourth embodiment (refer to FIG. 6). In other words, it is manufactured by applying the manufacturing method of field emission type cold cathode using the plating method as shown in the first or second embodiment. However, in the flat type image display device according to this embodiment, the display is performed without using the gate electrode.

In this flat type image display device, there is, so called, a metal back layer 66 consisting of metal thin film layer like Al thin film layer formed on the luminescent element layer 65. This metal back layer 66 performs as conductive layer for discharging electrons on the luminescent material layer 65 and reflecting emissive light from the luminescent material layer 65. The metal back layer 66 may be used as anode electrodes so that transparent anode electrodes 64 may be eliminated.

In this embodiment, an example using the method as shown in the first or second embodiment has been described; however, it is also possible to manufacture the flat type image display device by applying the manufacturing method of field emission type cold cathode as described for the third embodiment.

(Embodiment 6)

FIG. 10A to FIG. 10D show schematically the manufacturing process of field emission type cold cathode device according to a sixth embodiment of the present invention.

Figure 10A:
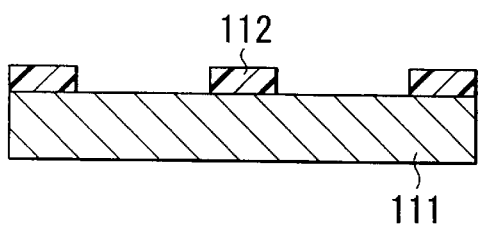
FIG. 10A to FIG. 10D show schematically the manufacturing process of field emission type cold cathode device according to a sixth embodiment of the present invention.

First, as shown in FIG. 10A, a photoresist pattern 112 is formed on a metal substrate (conductive support substrate) 111. Next, like embodiment 1, Ni—B—P base electroless plating liquid 113, adjusted to about PH5, is prepared by dissolving about 25 g of nickel sulfate, about 40 g of sodium hypophosphite, about 10 g of sodium acetate, about 10 g of sodium citrate, and about 30 g of boric acid in about 1 litter of distillated water. About 50 g of fullerene $C_{60}$ or carbon nanotube are mixed in this plating liquid.

Thus, the substrate 111 is immersed in the plating solution 113 for about 3 minutes. As the result, fullerene or carbon nanotube has precipitated down to contact with the surface of the substrate 111 and the photoresist pattern 112, and a Ni—B—P base electroless plating layer (metal plating layer 115) containing fullerene or carbon nanotube is formed on the surface of the substrate 111 and the photoresist pattern 112 with a thickness of about 3 μm as shown in FIG. 10B. Then, the photoresist pattern 112 is eliminated by the stripper solution and the metal plating layer 115 on the photoresist pattern 112 is lifted off and eliminated.

Figure 10C:
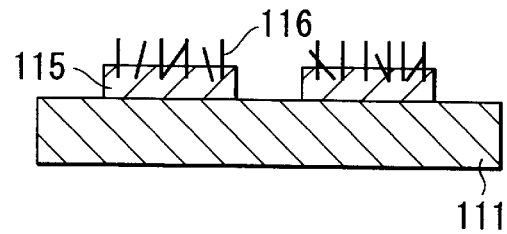
Figure 10B:
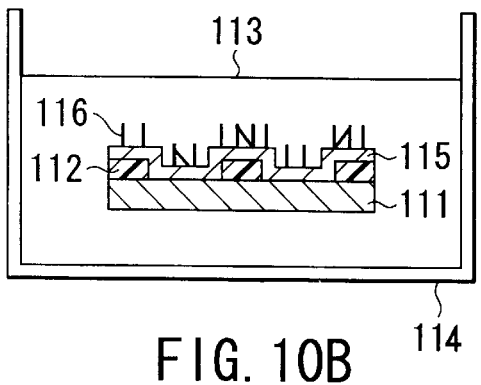
Figure 10D:
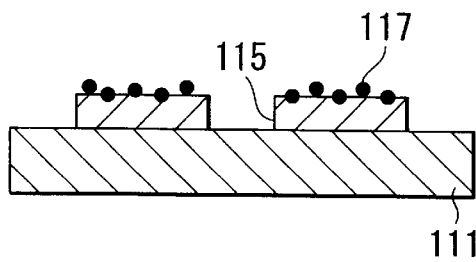

Finally, as shown in FIG. 10C (for carbon nanotube 116) or FIG. 10D (for fullerene 117), patterned metal layers 115 are formed on the metal substrate 111. The metal substrate can be used as the electrode so that a patterned field emission type cold cathode can be obtained.

(Embodiment 7)

Figure 11A:
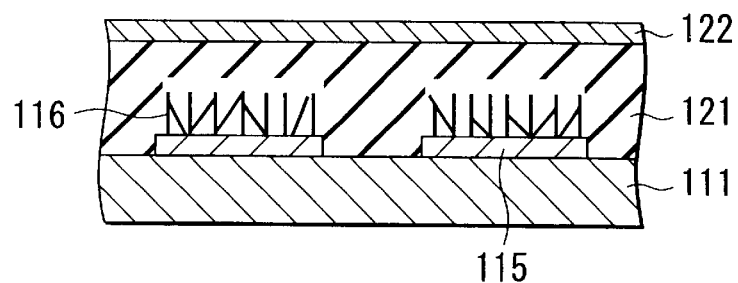
FIG. 11A and FIG. 11B show schematically the manufacturing process of vacuum micro device according to a seventh embodiment of the present invention.
Figure 11B:
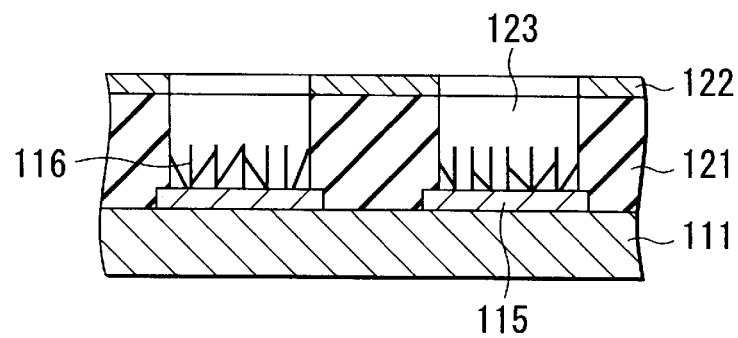

FIG. 11A and FIG. 11B show schematically the manufacturing process of vacuum micro device according to a seventh embodiment of the present invention. This vacuum micro device is manufactured by applying the manufacturing method of field emission type cold cathode using the plating method as shown in the sixth embodiment.

First, as shown in FIG. 11A, an insulation layer 121 made of $SiO_2$ or SiN or the like is formed on the field emission type cold cathode substrate including patterned metal plating layer 115 containing carbon nanotube 116 and metal substrate 111, and further, a gate electrode layer 122 made of conductive material such as W is formed thereon. The insulation layer 122 can be formed by electron beam evaporation method, spattering method, CVD method or others.

Next, as shown in FIG. 11B, the gate electrode layer 122 and the insulation layer 121 are patterned by lithography technology to form gate electrode and gate wiring. At this time, the metal plating layer 115 containing carbon nanotube 116 is exposed in a cavity (concave portion) 123 surrounded by the insulation film 121 and the gate electrode 122.

Thus, a vacuum micro device using the carbon nanotube 116 fixed to the metal plating layer 115 as electron emission section is manufactured. It goes without saying, a metal plating layer 115 containing fullerene in place of carbon nanotube may be formed.

(Embodiment 8)

Figure 12A:
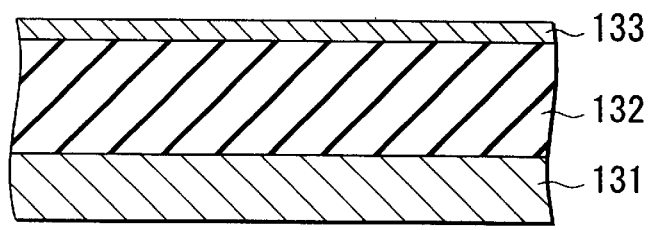
FIG. 12A to FIG. 12C show schematically the manufacturing process of vacuum micro device according to an eighth embodiment of the present invention.
Figure 12B:
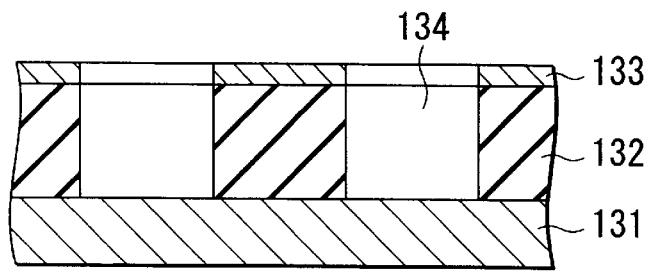
Figure 12C:
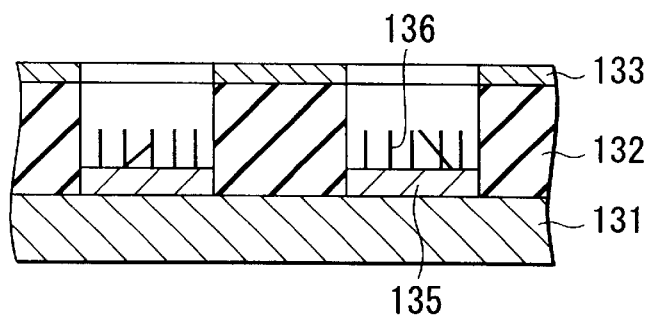

FIG. 12A to FIG. 12C show schematically the manufacturing process of vacuum micro device according to an eighth embodiment of the present invention.

First, as shown in FIG. 12A, an insulation layer 132 made of $SiO_2$ or SiN or the like is formed on the metal substrate 131, and further, a gate electrode layer 133 made of conductive material such as W is formed thereon. The insulation layer 132 can be formed by electron beam evaporation method, sputtering method, CVD method or others.

Next, as shown in FIG. 12B, the gate electrode layer 133 and the insulation layer 132 are patterned by lithography technology to form gate electrode and gate wiring. At this time, the metal substrate 131 is exposed in a cavity (concave portion) 134 surrounded by the insulation film 132 and the gate electrode 133.

Next, as shown in FIG. 12C, a metal plating layer 135 containing carbon nanotube 136 is formed on the metal substrate 131, by the electroplating processing as described in the second embodiment.

Thus, a vacuum micro device using the carbon nanotube 136 fixed to the metal plating layer 135 as electron emission section is manufactured. It goes without saying, a metal plating layer 135 containing fullerene in place of carbon nanotube may be formed.

In the respective embodiments mentioned above, examples using Ni—B—P base plating layer as metal plating layer have been shown; however, PTFE (polytetrafluoro ethylene) may be added in place of B and P, and in this case also, the current emission stability or the like can be enhanced by so-called resistive ballasting effect. In addition, Cr, or Cu or the like can be used in place of Ni, as metal plating layer. When Ni—B—P base plating layer is used for metal plating layer, it is preferable to make B concentration in the metal plating layer about 3 to 40%, and P concentration about 7 to 40%. Besides, when Ni plating layer including PTFE is used for metal plating layer, it is preferable to make PTFE concentration in the metal plating layer about 0.1 to 30%.

Also, a metal plating layer made of only metal such as Ni, Cr or Cu may be used as metal plating layer, without adding B, P or PTFE or similar substance. The conductivity of metal plating layer obtained by plating method is substantially equivalent to the bulk metal (equal or superior to about 99% of bulk metal) and superior to the case where the carbon nanotube is formed by printing (about 10 to 20% of bulk), or metal films obtained by spattering method (about 30 to 90%). Therefore, image quality deterioration by signal delay due to the increase of wiring resistance or other problems can be prevented, when a large area flat type image display device is to be manufactured.

In addition, for the metal plating layer obtained by the plating method, it is possible to manufacture with a large thickness such as about 300 $\mu$m or more, and it is possible to reduce the wiring resistance greatly. On the other hand, for the metal layer obtained by the sputtering method, the increase of thickness may cause to peel off the film or deteriorate the film quality by the inner stress, therefore, in practice, the film thickness is limited to about 1 to 2 $\mu$m or less, and it is difficult to reduce the wiring resistance. As for the thick film printing, the film thickness that can be manufactured by a single printing is normally limited to about 10 to 50 $\mu$m. Consequently, for manufacturing a film equal or superior to several hundreds gm in thickness, it is necessary to anneal each time it is printed, provoking the deterioration of carbon nanotube.

Besides, in the foregoing respective embodiment, the curvature radius of fullerene and carbon nanotube tip portion is made about 100 nm or less, preferably about 50 nm or less, more preferably about 30 nm or less, and still more preferably about 15 nm or less.

In addition, in the foregoing embodiment, the metal plating layer is formed using plating liquid containing fullerene and carbon nanotube; however, the metal plating layer can be formed using plating liquid containing carbon base field emission material (carbon, graphite, diamond), metal fine particle (Mo, Ta, W, Ni, Cr, Au, Ag, Pd, Cu, Al, Sn, Pt, Ti, Fe), semiconductor fine particle (Si), low work function material fine particle of 4 eV or less in work function (LaB$_6$, beta W, SiC, Al$_2$O$_3$, aluminum boride (9Al$_2$O$_3$.2B$_2$O$_3$), potassium titanate ), or negative electron affinity (NEA) material fine particle (diamond, AlN, GaN, TiN, TiC, AlGaN), in place of fullerene and carbon nanotube.

Moreover, in addition to the aforementioned applications, the field emission type cold cathode device according to the present invention can be used for vacuum micro power device, environmental resistant device (space device, nuclear power device, extreme environmental resistant device (radiation resistant device, high temperature resistant device, low temperature resistant device)), various sensors, or others.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A field emission cold cathode device comprising:

a substrate; and a metal plating layer formed on said substrate by either electroplating processing or electroless plating processing;

wherein said metal plating layer contains at least one carbon structure selected from a group of fullerenes and carbon nanotubes, said carbon structure being stuck out from an upper portion of said metal plating layer and a part of said carbon structure being buried in said metal plating layer; and wherein said metal plating layer contains an additive material which increases resistance of said metal plating layer.

2. The field emission cold cathode device according to claim 1, wherein said additive material is selected from a group of boron, phosphorus and polytetrafluoroethylene.

* * * * *

UNITED STATES PATENT AND TRADEMARK OFFICE
CERTIFICATE OF CORRECTION

PATENT NO.   : 6,664,727 B2
DATED        : December 16, 2003
INVENTOR(S)  : Nakamoto It is certified that error appears in the above-identified patent and that said Letters Patent is hereby corrected as shown below:

<u>Title page, Item [54] and Column 1, line 1,</u>
Title should read: -- [54] FIELD EMISSION TYPE COLD CATHODE DEVICE, MANUFACTURING METHOD THEREOF AND VACUUM MICRO DEVICE --

Signed and Sealed this

Thirtieth Day of March, 2004

JON W. DUDAS
*Acting Director of the United States Patent and Trademark Office*